United States Patent
Bryla et al.

(10) Patent No.: US 9,019,067 B2
(45) Date of Patent: Apr. 28, 2015

(54) ELECTRONIC LOCK WITH POWER FAILURE CONTROL CIRCUIT

(75) Inventors: Mark D. Bryla, New Haven, CT (US); Steve Morse, New Haven, CT (US); Chris Wren, New Haven, CT (US)

(73) Assignee: Sargent Manufacturing Company, New Haven, CT (US)

( * ) Notice: Subject to any disclaimer, the term of this patent is extended or adjusted under 35 U.S.C. 154(b) by 882 days.

(21) Appl. No.: 12/981,928

(22) Filed: Dec. 30, 2010

(65) Prior Publication Data

US 2012/0169453 A1   Jul. 5, 2012

(51) Int. Cl.
G05B 23/02 (2006.01)
E05B 47/00 (2006.01)

(52) U.S. Cl.
CPC ......... E05B 47/00 (2013.01); *E05B 2047/0057* (2013.01); *E05B 2047/0059* (2013.01)

(58) Field of Classification Search
USPC .............. 340/3.1; 70/280; 307/112; 320/166; 324/764.01; 455/127.1, 343.1, 343.5, 455/343.6, 572, 574
See application file for complete search history.

(56) References Cited

U.S. PATENT DOCUMENTS

| | | | |
|---|---|---|---|
| 4,831,323 A * | 5/1989 | Melbert | 323/311 |
| 5,206,538 A * | 4/1993 | Orta | 307/66 |
| 5,283,905 A * | 2/1994 | Saadeh et al. | 713/324 |
| 5,790,961 A * | 8/1998 | Ingram et al. | 455/574 |
| 5,892,298 A * | 4/1999 | Levasseur | 307/64 |
| 6,097,973 A * | 8/2000 | Rabe et al. | 455/572 |
| 6,108,188 A * | 8/2000 | Denison et al. | 361/160 |
| 7,127,228 B2 * | 10/2006 | Chang et al. | 455/343.1 |
| 2003/0109243 A1 * | 6/2003 | Chang et al. | 455/343 |
| 2005/0162017 A1 * | 7/2005 | Chin et al. | 307/44 |
| 2005/0162132 A1 * | 7/2005 | Nagasawa | 320/128 |
| 2005/0164749 A1 * | 7/2005 | Conforti | 455/574 |
| 2006/0072268 A1 * | 4/2006 | Kang | 361/92 |
| 2006/0181153 A1 * | 8/2006 | Oberle et al. | 307/112 |
| 2006/0262462 A1 * | 11/2006 | Barton | 361/1 |
| 2008/0053174 A1 * | 3/2008 | Amir | 70/493 |
| 2008/0177458 A1 * | 7/2008 | Malone et al. | 701/113 |
| 2008/0218154 A1 * | 9/2008 | Ashburn et al. | 324/119 |
| 2008/0230606 A1 * | 9/2008 | Thompson et al. | 235/385 |
| 2008/0266737 A1 * | 10/2008 | Conway et al. | 361/87 |
| 2008/0289377 A1 * | 11/2008 | Alef | 70/280 |
| 2008/0311961 A1 * | 12/2008 | Cotevino et al. | 455/574 |
| 2009/0128157 A1 * | 5/2009 | Moriya | 324/426 |

(Continued)

FOREIGN PATENT DOCUMENTS

JP   6185250   7/1994
KR   100739208   7/2007

*Primary Examiner* — Quang D Pham
(74) *Attorney, Agent, or Firm* — DeLio, Peterson & Curcio, LLC

(57) ABSTRACT

An electronic lock with power failure control circuit includes a lock mechanism having a latchbolt movable between extended and a retracted positions and an electrically powered lock actuator to lock and unlock the latchbolt. The power failure control circuit includes a microcontroller and the lock is connected to a primary power source and an auxiliary power source, preferably supercapacitors and charger that can be turned on by the microcontroller and off when the charger signals a full charge. A power monitor circuit detects low voltage on the primary power supply and sets a power failure interrupt causing the microcontroller to execute power failure instructions that control the actuator so that the lock is placed into a desired locked or unlocked final state during the power failure. upon detection of the return of good power, the system resets the lock.

15 Claims, 4 Drawing Sheets

(56) References Cited

U.S. PATENT DOCUMENTS

| | | | |
|---|---|---|---|
| 2009/0241615 A1* | 10/2009 | Hansknecht | 70/224 |
| 2010/0031714 A1* | 2/2010 | Brown et al. | 70/91 |
| 2010/0127858 A1* | 5/2010 | Wu et al. | 340/540 |
| 2010/0180649 A1 | 7/2010 | Harvey | |
| 2011/0010568 A1* | 1/2011 | Kageyama et al. | 713/300 |
| 2011/0031811 A1* | 2/2011 | Park et al. | 307/66 |
| 2011/0056253 A1* | 3/2011 | Greiner et al. | 70/85 |
| 2011/0067464 A1* | 3/2011 | Chiou et al. | 70/278.7 |
| 2011/0163719 A1* | 7/2011 | Law | 320/110 |
| 2011/0227693 A1* | 9/2011 | Ekus | 340/3.1 |
| 2012/0068542 A1* | 3/2012 | Alappat | 307/66 |
| 2012/0098475 A1* | 4/2012 | Noguchi | 318/479 |
| 2013/0141245 A1* | 6/2013 | Gadonniex et al. | 340/693.3 |
| 2014/0103955 A1* | 4/2014 | Avritch et al. | 324/764.01 |

\* cited by examiner

ELECTRONIC LOCK WITH POWER FAILURE CONTROL CIRCUIT

BACKGROUND OF THE INVENTION

1. Field of the Invention

This invention relates to electronic locks and to control circuits for such locks that operate when power fails or when the power supply voltage decreases. More specifically, this invention relates to power failure control circuits that operate to set a desired locked or unlocked status for the lock during the power failure period and to ensure proper startup and lock operation after power is restored.

2. Description of Related Art

Electronic locks are widely used in hotels, public buildings, prisons and commercial establishments as well as in high-end residential installations to provide sophisticated operational features. Such features may include electronic logging of lock operation, remote control of lock function, access authorization, indications of unauthorized break-in attempts and other lock and security related features.

Locks of this type typically include an electromechanical lock actuator to lock and unlock the door and may offer a variety of other features, including non-volatile memory storage, wired or wireless remote communication capability, such as WiFi, Bluetooth or infrared, LED indicators and/or LCD screens for signaling lock status, input devices, such as keypads, thumbprint readers, RFID or other electronic security devices for reading electronic keys and/or environmental sensors for temperature, smoke, or fire conditions.

There are many electronic lock designs, providing a variety of different features, however such electronic locks typically include a microcontroller or microprocessor (hereinafter referred to as the "microcontroller") running a stored control program to provide the various lock functions and features. Each of the electrically operated and controlled components requires electrical power to function properly.

Power for the electronic lock may be provided by batteries, a hard wired connection to a power supply or by any other known power source. Regardless of the source of power, however, there is some risk that it will fail. When the power source of an electronic lock begins to fail, memory storage may become corrupted during any attempt to write to storage, wireless or wired communication may become disrupted, and other electronic lock functions may fail to operate correctly.

Ultimately, in a power fail condition, the lock actuator will be unable to switch between the locked and unlocked state. Accordingly, it is important that the final state of the lock be controlled so that the lock fails to a desired state, with the door either locked or unlocked. Moreover, the lock should fail to a condition that allows it to return to normal operation when power returns. Thus, memory storage functions, remote communication and similar functions should all stop prior to the point that they become unreliable so that the failure occurs to a known state from which normal operation can be resumed when power returns.

In some installations, it is desirable for the lock to fail to the locked state. For example, where the lock is installed at the entrance to a secure room, it is often desirable for the lock to fail so that it continues to prevent unauthorized entry from the exterior side. In this type of installation, the lock mechanism is usually designed to allow an authorized person on the inside to exit the secure area even when the lock has no power. This design maintains security, while preventing people from becoming trapped in an emergency after power has failed.

In other lock installations, it is preferred that the lock fail to the unlocked state. This may facilitate emergency access, prevent people from becoming trapped behind locked doors, etc.

It is an object of the present invention to provide an electronic lock that shuts down to a selected locked or unlocked state when power is lost or voltage is reduced below a minimum operating voltage.

It is another object of the present invention to provide an electronic lock that shuts down to a known state.

Still other objects and advantages of the invention will in part be obvious and will in part be apparent from the specification

SUMMARY OF THE INVENTION

The above and other objects, which will be apparent to those skilled in the art, are achieved in the present invention which is directed to, in a first aspect, an electronic lock that includes a latchbolt movable between an extended and a retracted position, the lock having a locked state and an unlocked state, the latchbolt being prevented from moving to the retracted position when the lock is in the locked state. A lock control circuit includes a microcontroller and a memory having a stored control program including microcontroller executable instructions for a power failure state and microcontroller executable instructions for a normal power state.

A primary power supply input to the lock control circuit is adapted for connection to a primary source of electrical power. An electrically powered lock actuator is connected to the microcontroller. The lock actuator is responsive to a signal from the microcontroller to move the lock between the locked state and the unlocked state.

A power monitor circuit has an input connected to the primary power supply input to detect a power failure condition, a control output and a signal output connected to the microcontroller. The power monitor circuit signals the microcontroller via a power failure signal applied to the signal output when a power failure condition is detected at the primary power supply input.

An auxiliary power supply includes a power output and an electrically controllable switch circuit includes a primary power input connected to the primary power supply input, an auxiliary power input connected to the auxiliary power output of the auxiliary power supply and a power output connected to provide power to the microcontroller and the lock actuator. A control input for the switch circuit is connected to the control output of the power monitor circuit. The power monitor circuit controls the switch circuit to select between the primary source of electrical power and the auxiliary power supply.

The microcontroller executes the microcontroller executable instructions for the power failure state after receiving the power failure signal from the power monitor circuit.

In one aspect the switch circuit includes a diode circuit having first and second power inputs and a power output. The diodes are preferably Schottky diodes. The first power input of the diode circuit receives power from the primary power supply input, the second power input receives power from the auxiliary power supply power output and the power output of the diode circuit is connected to provide power to the microcontroller and the lock actuator from the auxiliary power supply during a power failure condition.

The power monitor circuit includes a lower voltage threshold and sends the power failure signal to the microcontroller when the voltage at the primary power supply input is below the lower voltage threshold.

In the preferred design, the power monitor circuit further includes an upper voltage threshold and it signals the microcontroller to stop executing the microcontroller executable instructions for the power failure state and begin executing the microcontroller executable instructions for the normal power state when the voltage at the primary power supply input rises above the upper voltage threshold.

In another aspect of the invention, the electronic lock includes a voltage regulator circuit connected between the power output of the electrically controllable switch and the microcontroller.

In yet another aspect, the auxiliary power supply includes at least one supercapacitor and a supercapacitor charger connected to the microcontroller, the supercapacitor charger having an input for turning on and off the charger and an output for signaling the microcontroller when the at least one supercapacitor is charged, the microcontroller turning on the charger to charge the at least one supercapacitor and turning off the charger when the at least one supercapacitor is charged.

In another aspect of the invention, the microcontroller prevents execution of the microcontroller executable instructions for the power failure state until after the supercapacitor charger has signaled the at least one supercapacitor is charged.

In a further aspect, the microcontroller enables setting of a power failure interrupt after the supercapacitor charger has signaled the at least one supercapacitor is charged and the microcontroller sets the power failure interrupt only after the power failure interrupt has been enabled and after receiving the power failure signal from the power monitor circuit.

The microcontroller handles the power failure interrupt by discontinuing execution of instructions for the normal power state and sets a power failure flag. The microcontroller returns to the execution of instructions for the normal power state and one such normal power state instruction includes checking the power failure flag. The microcontroller leaves the normal power state and enters the power failure state only after checking the power failure flag during execution of the normal power state instructions.

In still another aspect, the microcontroller executable instructions for the power failure state include a power failure loop. The power failure loop instructions include a check to determine if power has returned. In the preferred embodiment, the power failure loop instructions reset the microcontroller if power has returned.

In a further aspect an LED indicator is connected to the microcontroller and the microcontroller blinks the LED to indicate it is in the power failure state.

In yet another aspect, the microcontroller disables a WiFi radio after entering the power failure state and before signaling the electrically powered lock actuator to move between the locked state and the unlocked state.

In a further aspect, the invention is directed to a system for shutting down and restarting an electronic lock under power failure conditions including:
  a microcontroller including a stored control program having a plurality of microcontroller executable instructions;
  a lock actuator output adapted for connection to a lock actuator, the lock actuator output being connected to the microcontroller and the microcontroller sending a signal to the lock actuator output to switch the lock actuator between a locked and an unlocked state;
  a primary power supply input adapted for connection to a primary source of electrical power;
  an auxiliary power supply having at least one supercapacitor for providing auxiliary power and a supercapacitor monitoring and charging circuit connected to the microcontroller;
  an electrically controllable switch circuit connected to the primary power supply input and the auxiliary power supply to supply auxiliary power during a power failure condition;
  a power monitor circuit having a comparator, the power monitor circuit being connected to the primary power supply input to detect the power failure condition, the power monitor circuit also being connected to the microcontroller to signal a good power condition and the power failure condition, the power monitor circuit also being connected to the electrically controllable switch circuit and the power monitor circuit switching the electrically controllable switch circuit upon detection of the power failure condition;
  a visual indicator operable by the microcontroller to indicate the power failure condition;
  the microcontroller executable instructions including:
    a normal power loop of microcontroller executable instructions organized as a cooperative multitasking loop of tasks and executed by the microcontroller to operate the electronic lock in normal power conditions, the normal power loop including:
      an instruction checking to determine if the power monitor circuit has signaled detection of a power failure condition;
      an instruction checking to determine if the at least one supercapacitor is fully charged;
      an instruction for turning on the supercapacitor charging circuit to charge the at least one supercapacitor when the at least one supercapacitor is not fully charged; and
      an instruction for turning off the supercapacitor charging circuit when the at least one supercapacitor is fully charged;
    a power failure loop of microcontroller executable instructions; the microcontroller executing the power failure loop after the power monitor circuit has signaled detection of a power failure condition, the power failure loop including:
      an instruction checking to determine if the power monitor circuit has signaled the good power failure condition,
      an instruction resetting the microcontroller after the power monitor circuit has signaled the good power failure condition;
    at least one instruction turning on the visual indicator to signal the power failure condition after the power monitor circuit has signaled detection of the power failure condition;
    at least one instruction sending the signal to the lock actuator output to switch the lock actuator to a desired locked or unlocked state for the power failure condition after the power monitor circuit has signaled detection of the power failure condition.

A still another aspect, the invention is directed to a method for shutting down and restarting an electronic lock under power failure conditions including the steps of:
  monitoring a primary power supply with a comparator circuit to detect a power failure condition and a good power condition by comparing a voltage of the primary power supply to a reference voltage;
  executing tasks in a loop during the good power condition;

switching to an auxiliary power supply having at least one supercapacitor in the power failure condition to supply power to the electronic lock from the at least one supercapacitor during the power failure condition;

setting the electronic lock to a desired locked or unlocked state after detecting the power failure condition;

repeatedly monitoring a charge level of the at least one supercapacitor during the good power condition;

turning on a supercapacitor charger during the good power condition when the charge level of the at least one supercapacitor is below a desired level;

turning off the supercapacitor charger during the good power condition when the charge level of the at least one supercapacitor has reached a desired level;

turning on a visual indicator during the power failure condition; and resetting the electronic lock after the power failure condition has been detected if the good power condition is subsequently detected for a predetermined period of time.

In another aspect, the step of executing tasks in a loop during the good power condition includes the steps of:

checking to detect a power failure condition after a first indication that the charge level of the at least one supercapacitor has reached a desired level;

setting a power failure flag upon detection of the power failure condition and returning to tasks in the loop executed during the good power condition; and checking if the power failure flag has been set, and thereafter executing the steps of setting the electronic lock to a desired locked or unlocked state for the power failure condition, turning on a visual indicator and resetting the electronic lock after the power failure condition has been detected if the good power condition is subsequently detected.

The method preferably further includes the step of turning off power consuming functions prior to the step of setting the electronic lock to a desired locked or unlocked state in the power failure condition.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-4 of the drawings in which like numerals refer to like features of the invention.

Broadly stated, an electronic lock with power failure control has been invented wherein a microcontroller receives inputs from a power monitor circuit to detect a decrease in power supply voltage (a power fail condition) and switches to supercapacitors as an auxiliary power source. The microcontroller controls a charging circuit to keep the supercapacitors charged. Once the microcontroller detects that the supercapacitors are fully charged, it enables setting of a power failure interrupt.

When the power monitor circuit detects a power failure condition, it sets the power failure interrupt and switches power from primary power to auxiliary power (available from the supercapacitors). When the microcontroller detects that the power failure interrupt has been set, it turns off circuit components that draw power, such as WiFi, and operates the lock actuator to lock or unlock the lock mechanism. This leaves the lock in the desired state during the power failure condition.

Figure 1:
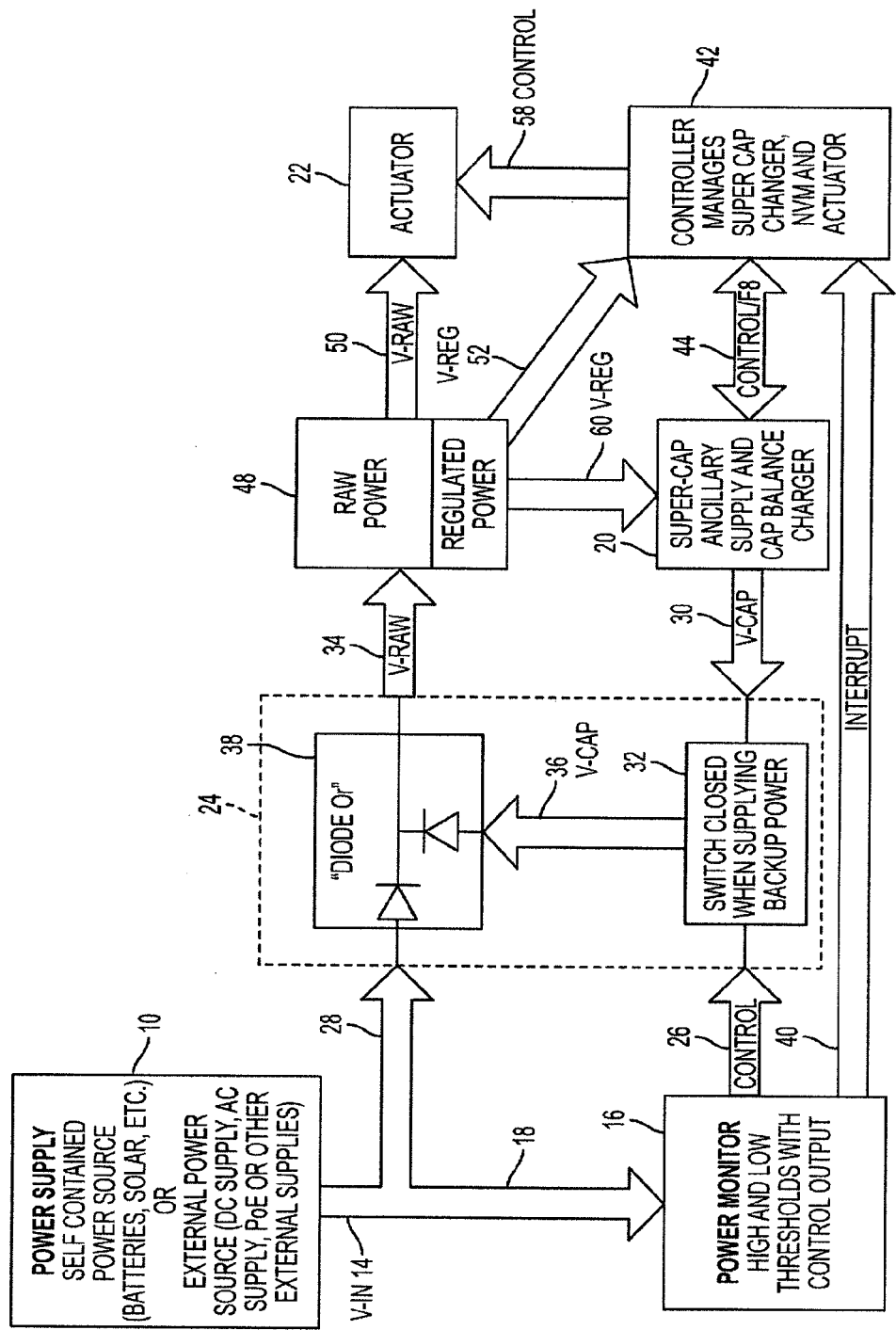
FIG. 1 shows a block circuit diagram of one embodiment of a power failure monitoring and lock control circuit according to the present invention.
Figure 2:
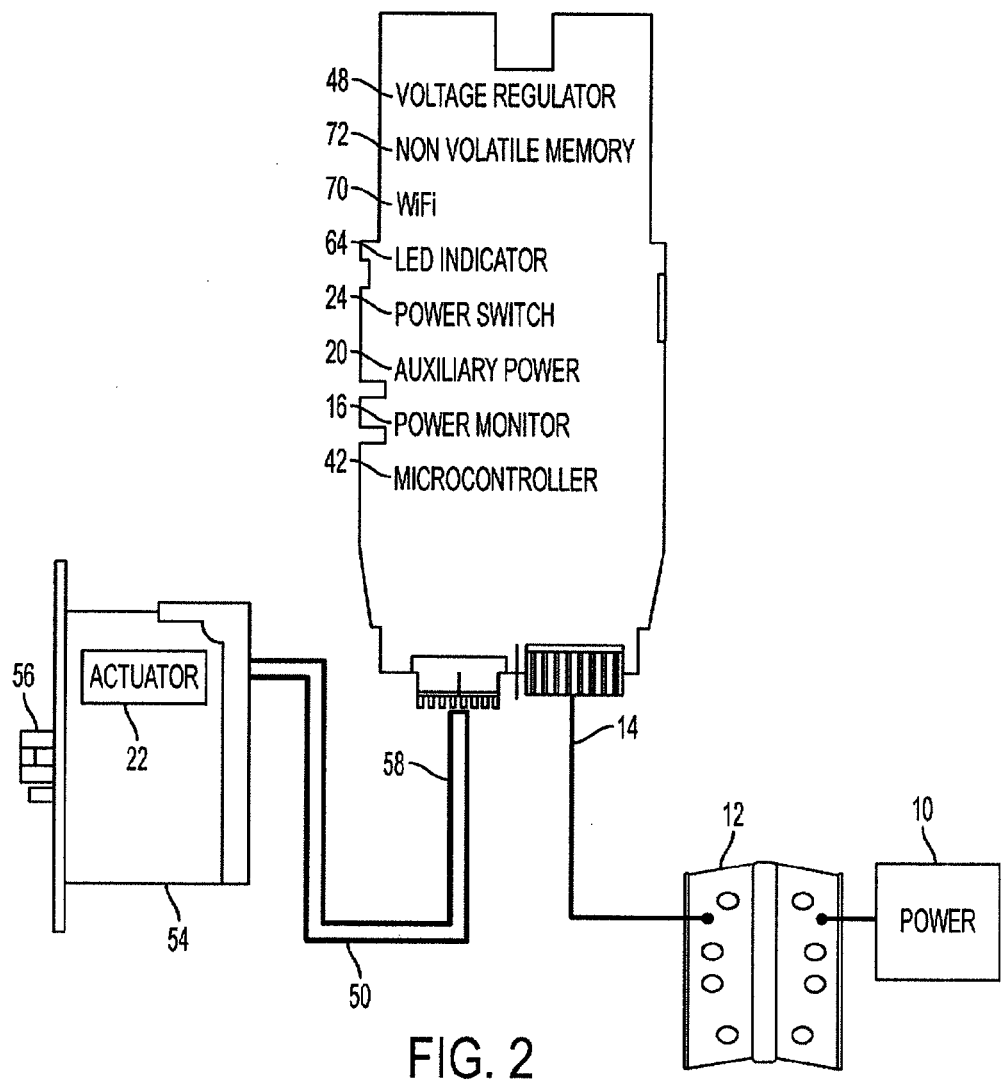
FIG. 2 shows an electronic lock according to the present invention in which external power is provided through a wire via an electric hinge. The power failure monitoring and lock control circuit of FIG. 1 is indicated schematically and the circuit controls an actuator within a mortise lock.

Referring to FIGS. 1 and 2, a lock according to the present invention includes a lock control circuit that receives power from a primary power supply 10. The primary power supply 10 is shown as an external power source in FIG. 2 and provides power through wires which pass through an electric hinge 12 and arrive as the input voltage (V-IN) at the point marked 14. The electric hinge allows wired power connection through the door hinges to the lock mechanism 54 mounted on the door. Although an external power source 10 is shown, the primary power may be supplied by onboard batteries within the lock mechanism, or by any other known power source.

The lock control circuit includes an input connected to the primary power supply 10. The voltage of the primary power supply at this input is immediately monitored by power monitor circuit 16 at input 18. When primary power fails, auxiliary power is available, preferably from supercapacitors, in the auxiliary power supply 20. The function of the power monitor circuit 16 is to detect the decreased voltage of the primary power supply at the input to the lock control circuit.

Supercapacitors are electrochemical capacitors with a high energy density. They typically have many thousands of times greater energy density than regular electrolytic capacitors. This allows them to store sufficient energy within a small physical space to operate the lock circuitry and move the electrically powered lock actuator 22 between the locked and unlocked state. Typically, the lock actuator 22 will be mounted in the lock body 54, while the other circuit components will be mounted on a circuit board (schematically shown in FIG. 2) inside a housing mounted to the inner and/or outer faces of the door.

The circuit board will typically include additional components, such as WiFi radio components, WiFi antenna, card readers, thumbprint or biometric scanners and the like for the desired security features of the lock mechanism.

The power monitor circuit 16 controls an electrically controllable switch circuit 24 via control output 26. The power switch circuit receives primary power at input 28 and auxiliary power from the auxiliary power output 30 of the auxiliary power supply 20. When the primary power supply voltage on 18 is above an upper voltage limit, the power monitor circuit 16 turns off switch 32 within the electrically controllable switch circuit 24. When the primary power supply voltage on 18 is below a lower voltage limit, the power monitor circuit 16 turns on switch 32.

When the primary power supply voltage is high (above the upper voltage limit) and switch 32 is off, the primary supply 10 at input 28 is connected to the output 34 (V-RAW) of the switch circuit 24 (through diode OR 38). When the primary power supply voltage is low (below the lower voltage limit) and switch 32 is on, the auxiliary power supply 20 at input 30 is connected to the output 34 (V-RAW) of the switch circuit 24 through the switch 32, V-CAP 36 and the diode OR circuit 38.

In the preferred embodiment, the diode OR circuit is formed with low forward voltage drop Schottky diodes. Also in the preferred design, the high and low thresholds are related by hysteresis. When the voltage of the power supply 10 is below the lower threshold of the power monitor 16, both the control output 26 and the signal output 40 are on (although the actual digital logic level may be low or high depending on preference of the designer). This is the power failure condition. The control line 26 from the power monitor 16 keeps the switch 36 closed to supply auxiliary power from the supercapacitors (super-CAPs) in 20 and the signal output 40 is sending a power failure signal to the controller (microcontroller) 42 and attempting to set a power fail interrupt.

As the voltage of the power supply 10–rises from below the lower threshold of the power monitor 16, the control line 26 and interrupt 40 remain on until the voltage at 18 has risen above the upper threshold voltage limit of the power monitor. At that point, the control line 26 and interrupt line 40 turn off. The switch 32 opens to turn off auxiliary power and the interrupt line 40 stops signaling the microcontroller 42 to set a power fail interrupt.

Although the power monitor 16 attempts to set a power fail interrupt on the microcontroller 42 via interrupt line 40 when that line is on, as will be described below, it cannot actually set that interrupt unless the interrupt has been enabled by the microcontroller software. The microcontroller software includes microcontroller executable instructions forming a stored control program that is stored in memory, preferably in flash memory integrated with the microcontroller. The stored control program includes executable instructions for the power failure state and instructions for the normal power state.

When the primary power supply voltage is falling (the reverse direction from the description above), the voltage of the power supply 10 will decrease from above the upper threshold of the power monitor 16 to below that threshold. The switch 32 remains open and the interrupt line 40 remains off as the voltage falls below the upper threshold. It is not until the voltage of the power supply 10 has fallen to below the lower threshold that switch 32 closes (to supply auxiliary power). At this point, the interrupt line tries to set the power fail interrupt.

The hysteresis provided by the upper and lower voltage threshold limits helps to ensure that the system does not oscillate at or near the transition point between a power failure condition and a power good condition. In the power failure condition, when the switch system 24 begins to supply power from the auxiliary power source, the load on the primary power source is reduced. This load reduction allows the primary power source to recover. The voltage at 18 rises as a result. The high threshold limit of the power monitor is set sufficiently high to ensure that this voltage recovery does not immediately cause the system to switch out of the power failure state.

If the upper threshold limit is set too low, the voltage recovery of the primary power supply due to switching to the auxiliary supply may cause the power monitor to believe that sufficient power is now available. The power monitor then switches the system out of the power failure state, returning the load to the primary power supply. This increased load then causes the voltage at 18 to fall below the lower threshold limit, the system returns to the power failure condition and the entire system repeats this oscillating cycle.

The auxiliary power supply 20 preferably includes a pair of 3 farad supercapacitors and a charging circuit that can be turned on and off by the microcontroller 42 via a control line 44', which is part of control path 44 in FIG. 1. In the preferred embodiment, the control path 44 also includes a signal line 44" which allows the auxiliary power supply to signal to the microcontroller 42 when the supercapacitors are fully charged. The system will not attempt to use the auxiliary power supply until the supercapacitors have been initially fully charged. The charger signals the microcontroller 42 when the supercapacitors have decayed in voltage. The microcontroller then turns on the charger until they have been recharged. This allows the supercapacitors to remain fully charged without constantly leaving the charger turned on.

The output 34 (V-RAW) of the switch circuit 24 supplies the input of a voltage regulator circuit 48 having an unregulated (V-RAW) voltage output 50 and a regulated (V-REG) voltage output 52. The unregulated output 50 is merely a straight pass through connection of the unregulated input power. It is used to supply operating power to the electromechanical actuator 22 in the lock mechanism 54 and any other devices that do not require regulated power.

The regulated output 52 supplies power to the microcontroller 42 over power line 52. It supplies regulated voltage to the auxiliary power supply 20 over power line 60. Although it is not shown, the regulated power is also supplied to other circuit components and logic chips that require regulated power. This may include chips in the power monitor 16, the switch circuit 24 and its internal, electrically controlled, switch 32, as well as in other lock components and modules not shown, such as WiFi communication chips and the like.

The lock mechanism 54 includes a latchbolt 56 that is movable between extended and retracted positions with handles (not shown). The latchbolt may be locked or unlocked by the electrically operated actuator 22 to place the lock in the locked or unlocked state. In the locked state, the latchbolt is prevented from moving to the retracted position. This may be accomplished by blocking the rotation of the retracting mechanism or by preventing rotation of the handles from operating the retracting mechanism.

The desired final state (locked or unlocked) of the lock mechanism when a power failure has been detected may be configured with a switch, a jumper or by software programming of the microcontroller 42. When a physical switch or jumper is used, the microcontroller 42 reads the status of that switch or jumper to determine the desired locked or unlocked final state of the lock 54 in the power failure condition.

When a power failure condition is detected, the microcontroller 42 sends a signal over control line 58 to move the actuator 22 between the locked state and the unlocked state. The final desired unlocked or locked state is set according to the configuration of the lock mechanism when installed.

A brief summary of basic operation can now be provided. When the system is initially started or reset, the microcontroller 42 will boot up, then read and begin to execute stored microcontroller executable instructions from an internal or external memory. The primary power supply will have a voltage that is above the upper threshold limit of power monitor 16, but regardless, the supercapacitors will not be charged.

The microcontroller executable instructions are preferably organized in a cooperative multitasking loop suitable for real time control. In the cooperative multitasking loop a series of tasks are executed in sequence, with each task voluntarily ceding time to the next task or being designed to always complete and turn control over to the next task. In the preferred design, the loop completes once each minute.

One such task is a power failure monitoring task, which functions to detect power failure and control the power failure system. The power failure task enables the supercapacitor charger in the auxiliary power supply 20 and detects if the supercapacitors are fully charged. When fully charged, the microcontroller enables setting of the power failure interrupt. This allows the power monitor 16 to set the power failure interrupt under the power failure conditions previously described. Until the supercapacitors are fully charged, this interrupt cannot be set.

The power failure interrupt is an asynchronous function that can interrupt the cooperative multitasking loop at any time. To prevent any significant interruption in that loop, the interrupt handler code merely sets a power failure flag and immediately returns control to the cooperative multitasking loop. The power failure monitoring task includes a step that checks the status of the power failure flag. Until the supercapacitors are fully charged and ready for use as an auxiliary power source, the power failure interrupt is not enabled and the power failure flag cannot be set.

Figure 4:
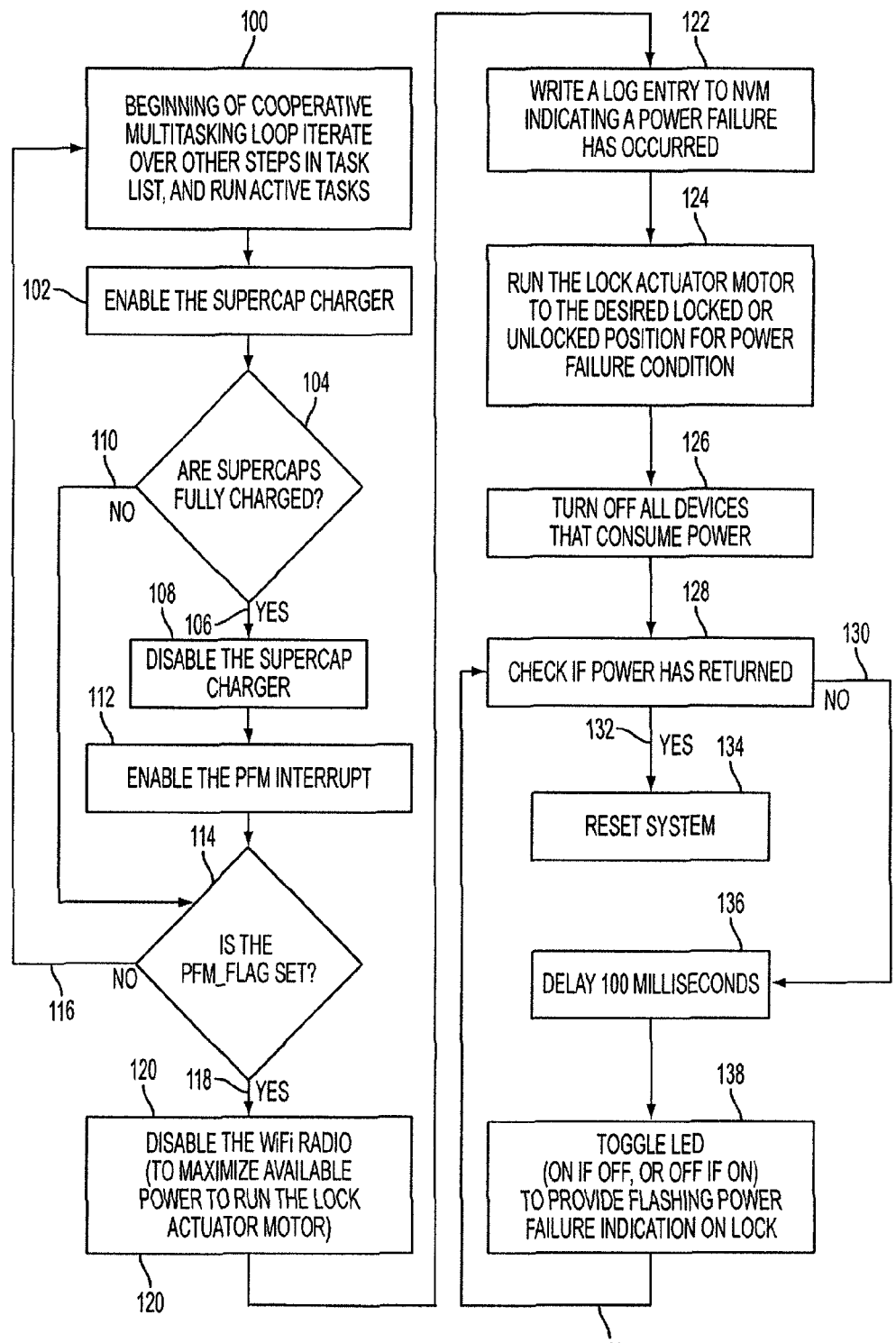
FIG. 4 illustrates a flow chart of power failure software and method steps.

FIG. 4 provides a block diagram of the cooperative multitasking loop and the relevant steps in the power failure task. Block 100 is the beginning of the cooperative multitasking loop and includes all the tasks and steps in that loop that are completed by the microcontroller 42 during normal operation. In block 102, the supercapacitor (super-CAP) charger in the auxiliary power supply 20 is enabled over control path 44 and control line 44'. The supercapacitors begin charging.

In block 104 the status of the supercapacitor charge level is detected (over signal line 44"). If the supercapacitors are fully charged, program flow path 106 is taken to block 108 and the charger is turned off (block 108) and the power failure monitoring (PFM) interrupt is enabled in block 112 The status of the power failure flag (PFM_Flag) is then checked in block 114.

If the supercapacitors are not fully charged in block 108, then program flow path 110 is taken directly to block 114, skipping blocks 108 and 112. This leaves the charger on and the interrupt disabled.

From block 114, if the power failure flag (PFM_Flag) is not set, (the normal condition), program flow will exit on path 116 and return to the cooperative multitasking loop in block 100. This loop, from block 100 (where all normal tasks are completed) to block 114 (where the power failure condition is detected) will continue as long as the voltage at 18 from the primary power supply remains above the lower voltage threshold of the power monitor 16.

During this normal loop from block 100 to block 114, the PFM interrupt will be enabled the first time that the charger signals that they have been charged and the supercapacitor charger will be turned off and later on again to hold the supercapacitors in the fully charged state.

Following enabling of the power failure interrupt, if the primary power supply voltage falls below the lower voltage threshold of the power monitor 16, the power failure flag will be set. This will cause program flow to exit block 114 on branch 118 to block 120. At this point, power failure has been detected and the WiFi radio 70 and/or any other high-power devices are turned off in block 120.

In block 122, a log entry is written to non volatile memory (NVM) to indicate that a power failure has occurred. By turning off high power devices, such as the WiFi radio ion block 120, the chance of corrupting the NVM 72 is minimized and power is conserved for block 124, where the lock actuator 22 is operated to place the lock in the final desired locked or unlocked state. The NVM may be part of the microcontroller or a separate chip. The program instructions are preferably stored in flash memory integrated with the microcontroller, but alternatively they may be stored in NVM or separately in other permanent or non-volatile memory that may be part of or separate from the microcontroller 42.

In block 126, all other power consuming devices under microcontroller control are turned off. In block 128, the code checks if power has returned to good. If not, program flow continues on branch 130 to block 136. If power has returned, program flow exits block 128 on branch 132 to block 134 and the entire system is reset.

In the preferred embodiment, the detection that power has returned is done by having the microcontroller 42 directly sample the voltage at the input pin that interrupt line 40 is connected to. If the voltage remains good for a preset period of time, preferably 3 seconds, the system is reset. In the preferred embodiment, the voltage at the input pin is repeatedly sampled to verify that power has returned and remained good for the entire preset period of time before the system is reset.

In block 136 the program delays 100 milliseconds (one tenth of a second) and then continues to block 138 where the status of an LED indicator light 64 is toggled. If the LED is on, it is turned off. If it is off, it is turned on. Program flow then returns to block 128 on branch 140.

As long as the power failure condition remains and auxiliary power is available from the supercapacitors, the system simply toggles the LED 64, blinking that indicator to indicate a power failure condition. When power returns, the system resets and restarts as in a normal startup.

Figure 3:
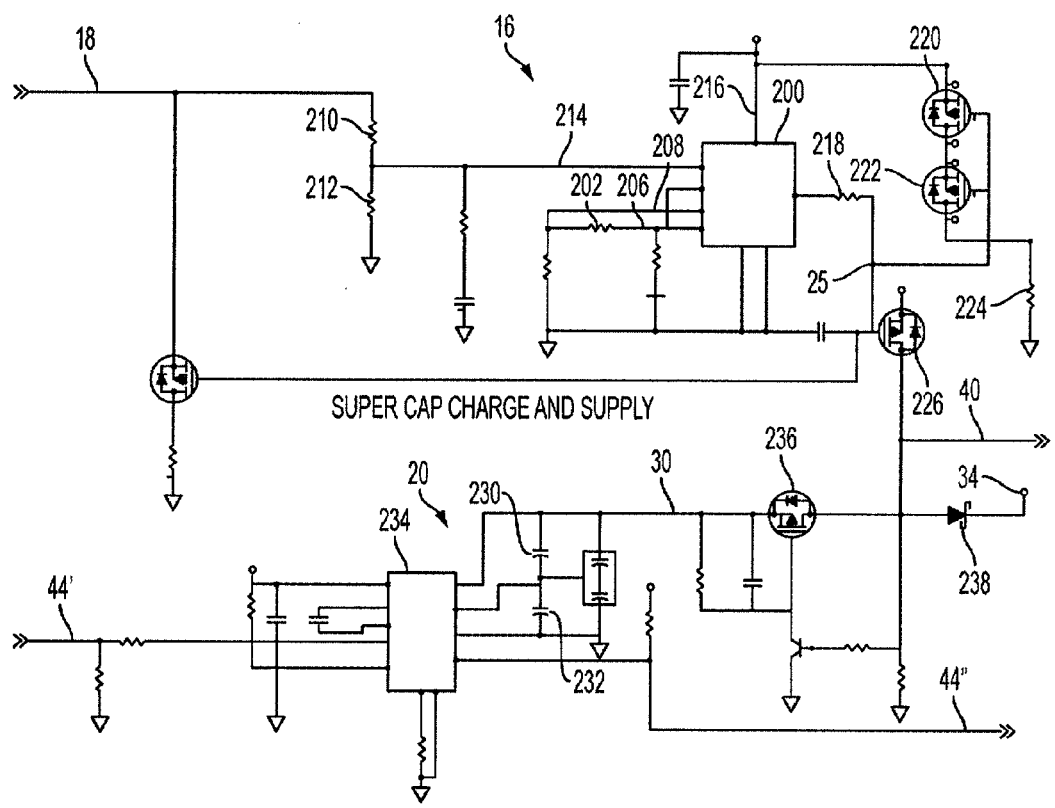
FIG. 3 shows a detailed circuit diagram of the power monitor and the supercapacitor charging and supply circuit seen in FIG. 1.

FIG. 3 provides a detailed circuit diagram for the preferred embodiment of the power monitor 16 and the auxiliary power supply circuits. The power monitor circuit of the preferred embodiment uses an LTC 1540 nanopower threshold comparator manufactured by Linear Technology Corporation with an internal voltage reference and adjustable hysteresis to set the upper and lower voltage threshold limits and detect the power failure condition.

Resistors 202 and 204 form a voltage divider between the reference output 206 and ground to set the hysteresis input at 208. The input 18 is applied to the comparator chip 200 through a voltage divider formed by resistors 210 and 212, which is applied to the V+ input of the chip 200 at 214. The V-minus (V−) input of the chip is connected to the reference output 206 of the chip 200. V-RAW operating power is applied at input 216 to the chip and the output is applied through resistor 218 to form the control output 26 of the power monitor circuit as previously described.

The output 26 in the preferred design is applied to MOSFETs 220 and 222 to connect V-RAW to a load resistor 224. This load helps to avoid oscillation between the power good and power fail condition by ensuring that a sufficient load is always on the power source.

When the output 26 goes high, signaling a power failure condition, MOSFET 226 turns on and the interrupt output 40 is also turned on to signal to the microcontroller that the power failure flag should be set (provided that the power failure interrupt has been enabled).

The auxiliary power supply 20 includes two 3 farad supercapacitors 230, 232 which are monitored and charged by an LTC3225 supercapacitor charger chip 234 manufactured by Linear Technology Corporation. The supercapacitor charging is enabled via input 44' which is part of the connection path 44 in FIG. 1. The power good output of the supercapacitor charger chip 234 is connected to 44". This forms a second part of the connection path 44 in FIG. 1.

The output 30 of the auxiliary power supply 20 (COUT on the LTC 3225) supplies supercapacitor auxiliary power to MOSFET 236 which acts as the electronically controllable switch 32 in FIG. 1. Low forward voltage drop Schottky diode 238 is part of the diode OR circuit 38 in FIG. 1 and connects the supercapacitor auxiliary power output to V-RAW 34.

Although supercapacitors are preferred as the auxiliary power source, other alternative auxiliary power sources may be used with this invention. Preferably microcontroller 42 is a PIC 18F8722 microcontroller manufactured by Microchip Technology, Inc.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

Thus, having described the invention, what is claimed is:

1. An electronic lock comprising:
   a lock including a latchbolt movable between an extended and a retracted position, the lock having a locked state and an unlocked state, the latchbolt being prevented from moving to the retracted position when the lock is in the locked state;
   a lock control circuit including a microcontroller and a memory having a stored control program including microcontroller executable instructions for a power failure state and microcontroller executable instructions for a normal power state;
   a primary power supply input connected to the lock control circuit and adapted for connection to a primary source of electrical power;
   an electrically powered lock actuator connected to the microcontroller, the lock actuator being responsive to a signal from the microcontroller to move the lock between the locked state and the unlocked state;
   a power monitor circuit having an input connected to the primary power supply input to detect a power failure condition, the power monitor circuit generates a control output to an electrically controllable switch circuit and a signal output connected to the microcontroller in response to the power failure condition, the power monitor circuit signaling the microcontroller via a power failure signal applied to the signal output when the power failure condition is detected at the primary power supply input; wherein the power monitor circuit includes a lower voltage threshold and determines the power failure condition based on whether a voltage at the primary power supply input is below the lower voltage threshold and wherein the power monitor circuit includes an upper voltage threshold and signals the microcontroller to stop executing the microcontroller executable instructions for the power failure state and begin executing the microcontroller executable instructions for the normal power state when the voltage at the primary power supply input raises above the upper voltage threshold for a preset period of time after the power failure condition occurred,
   an auxiliary power supply having an auxiliary power output;
   the electrically controllable switch circuit having a primary power input connected to the primary power supply input, an auxiliary power input connected to the auxiliary power output of the auxiliary power supply, a power output connected to the microcontroller to provide power to the microcontroller and the lock actuator, and a control input connected to the control output of the power monitor circuit, the power monitor circuit controlling the electrically controllable switch circuit to selectively connect the power output between the primary source of electrical power and the auxiliary power supply; and
   a visual indicator operable by the microcontroller to indicate the power failure condition;
   the microcontroller executing the microcontroller executable instructions for the power failure state after receiving the power failure signal from the power monitor circuit,
   wherein the microcontroller executable instructions including:
   a normal power loop, corresponding to the normal power state, of the microcontroller executable instructions organized as a cooperative multitasking loop of tasks and executed by the microcontroller to operate the electronic lock in normal power conditions of the normal power state, the normal power loop including:
      an instruction for checking to determine if the power monitor circuit has signaled detection of the power failure condition based on the power failure signal applied to the signal output;
      an instruction for checking to determine if an at least one supercapacitor of the auxiliary power supply is fully charged;
      an instruction for turning on they a supercapacitor charging circuit to charge the at least one supercapacitor when the at least one supercapacitor is not fully charged; and
      an instruction for turning off the supercapacitor charging circuit when the at least one supercapacitor is fully charged;
   a power failure loop, corresponding to the power failure state, of the microcontroller executable instructions; the microcontroller executing the power failure loop after the power monitor circuit has signaled the detection of the power failure condition based on the power failure signal applied to the signal output, the power failure loop including:
      an instruction for checking to determine if the power monitor circuit has signaled the power failure condition,
      an instruction for resetting the microcontroller after the power monitor circuit determines the primary power supply input returned if the voltage of the primary power supply input raises above the upper voltage threshold for the preset period of time;
      at least one instruction for turning on the visual indicator to signal the power failure condition after the power monitor circuit has signaled the detection of the power failure condition;
      at least one instruction for sending a signal to the lock actuator to switch the lock actuator to a desired locked or unlocked state in response to the power failure condition after the power monitor circuit has signaled the detection of the power failure condition; and wherein the lower voltage threshold and the upper voltage threshold relate by hysteresis to prevent oscillation at or near transition points between the power failure state and the normal power state whereby upon detecting the power failure condition the electrically controllable switch circuit receives power from the auxiliary power supply to reduce power load on and enable recovery of the primary power supply input, and once the primary power supply input has recovered the electrically controllable switch circuit switching power back to the primary power supply input.

2. The electronic lock of claim 1 wherein the electrically controllable switch circuit includes a diode circuit having first and second power inputs and the power output, the first power input receiving power from the primary power supply input, the second power input receiving power from the auxiliary power supply power output and the power output being connected to provide power to the microcontroller and the lock actuator from the auxiliary power supply during a power failure condition.

3. The electronic lock of claim 2 wherein the diode circuit uses Schottky diodes.

4. The electronic lock of claim 1 further including a voltage regulator circuit connected between the power output of the electrically controllable switch and the microcontroller.

5. The electronic lock of claim 1 wherein the supercapacitor charging circuit connected to the microcontroller, the supercapacitor charging circuit having an input for turning on and off the supercapacitor charging circuit and an output for signaling the microcontroller when the at least one supercapacitor is fully charged, the microcontroller turning on the supercapacitor charging circuit to charge the at least one supercapacitor and turning off the supercapacitor charging circuit when the at least one supercapacitor is fully charged.

6. The electronic lock of claim 5 wherein the microcontroller prevents execution of the microcontroller executable instructions for the power failure state until after the supercapacitor charging circuit has signaled the at least one supercapacitor is fully charged.

7. The electronic lock of claim 6 wherein the microcontroller enables setting of a power failure interrupt after the supercapacitor charging circuit has signaled the at least one supercapacitor is fully charged and the microcontroller sets the power failure interrupt after the power failure interrupt has been enabled and after receiving the power failure signal from the power monitor circuit.

8. The electronic lock of claim 7 wherein the microcontroller handles the power failure interrupt by discontinuing execution of instructions for the normal power state and setting a power failure flag, the microcontroller then returning to the execution of instructions for the normal power state, one such normal power state instruction including checking the power failure flag, the microcontroller leaving the normal power state and entering the power failure state and executing the microcontroller executable instructions for the power failure state only after checking the power failure flag during execution of the normal power state instructions and detecting that the power failure flag has been set.

9. The electronic lock of claim 1 wherein the microcontroller repeatedly checks that power has returned while waiting the preset period of time before resetting the microcontroller.

10. The electronic lock of claim 1 wherein the visual indictor comprises an LED indicator connected to the microcontroller, the microcontroller blinking the LED indicator to indicate the power failure state.

11. The electronic lock of claim 1 wherein the microcontroller disables a WiFi radio after entering the power failure state and before signaling the electrically powered lock actuator to move between the locked state and the unlocked state.

12. A system for shutting down and restarting an electronic lock under power failure conditions comprising:

a microcontroller including a stored control program having a plurality of microcontroller executable instructions;

a lock actuator output adapted for connection to a lock actuator, the lock actuator output being connected to the microcontroller and the microcontroller sending a signal to the lock actuator output to switch the lock actuator between a locked and an unlocked state;

a primary power supply input adapted for connection to a primary source of electrical power;

an auxiliary power supply having at least one supercapacitor for providing auxiliary power and a supercapacitor monitoring and charging circuit connected to the microcontroller;

an electrically controllable switch circuit connected to the primary power supply input and the auxiliary power supply to supply auxiliary power during a power failure condition;

a power monitor circuit having a comparator, the power monitor circuit being connected to the primary power supply input to detect the power failure condition, the power monitor circuit also being connected to the microcontroller to signal a normal power condition and a power failure condition, the power monitor circuit also being connected to the electrically controllable switch circuit and the power monitor circuit switching the electrically controllable switch circuit to selectively connect a power output of the electrically controllable switch circuit between the primary source of electrical power and the auxiliary power supply to provide power to the microcontroller and the lock actuator upon detection of the power failure condition;

wherein the power monitor circuit includes a lower voltage threshold and determines the power failure condition by comparing a voltage at the primary power supply input to the lower voltage threshold, wherein the power monitor circuit includes an upper voltage threshold and signals the microcontroller to stop executing the microcontroller executable instructions for a power failure state and begin executing the microcontroller executable instructions for a normal power state when the voltage at the primary power supply input raises above the upper voltage threshold for a preset period of time after the power failure condition occurred, and wherein the lower voltage threshold and the upper voltage threshold relate by hysteresis to prevent oscillation at or near transition points between the power failure state and the normal power state whereby upon detecting the power failure condition the electrically controllable switch circuit receives power from the auxiliary power supply to reduce power load on and enable recovery of the primary power supply input, and once the primary power supply input has recovered the electrically controllable switch circuit switching power back to the primary power supply input; and a visual indicator operable by the microcontroller to indicate the power failure condition;

wherein the microcontroller executable instructions including:

a normal power loop, corresponding to the normal power state, of the microcontroller executable instructions organized as a cooperative multitasking loop of tasks and executed by the microcontroller to operate the electronic lock in normal power conditions, the normal power loop including:
an instruction for checking to determine if the power monitor circuit has signaled the detection of the power failure condition;
an instruction for checking to determine if the at least one supercapacitor of the auxiliary power supply is fully charged;
an instruction for turning on the supercapacitor monitoring and charging circuit to charge the at least one supercapacitor when the at least one supercapacitor is not fully charged; and
an instruction for turning off the supercapacitor monitoring and charging circuit when the at least one supercapacitor is fully charged;
a power failure loop, corresponding to the power failure state, of the microcontroller executable instructions; the microcontroller executing the power failure loop after the power monitor circuit has signaled the detection of the power failure condition, the power failure loop including:
an instruction for checking to determine if the power monitor circuit has signaled the power failure condition,
an instruction for resetting the microcontroller after the power monitor circuit determines the primary power supply input returned if the voltage of the primary power supply input raises above the upper voltage threshold for the preset period of time;
at least one instruction for turning on the visual indicator to signal the power failure condition after the power monitor circuit has signaled the detection of the power failure condition;
at least one instruction for sending a signal to the lock actuator output to switch the lock actuator to a desired locked or unlocked state in response to the power failure condition after the power monitor circuit has signaled the detection of the power failure condition.

13. A method for shutting down and restarting an electronic lock under power failure conditions comprising:
monitoring a primary power supply input of the electronic lock with a power monitor and comparator circuit to detect a power failure condition and a normal power condition by comparing a voltage of the primary power supply input to a lower voltage threshold and an upper voltage threshold; wherein the electronic lock comprising:
a lock including a latchbolt movable between an extended and a retracted position, the lock having a locked state and an unlocked state, the latchbolt being prevented from moving to the retracted position when the lock is in the locked state;
a lock control circuit including a microcontroller and a memory having a stored control program including microcontroller executable instructions for a power failure state corresponding to the power failure condition and microcontroller executable instructions for a normal power state corresponding to the normal power condition;
the primary power supply input connected to the lock control circuit and adapted for connection to a primary source of electrical power;
an electrically powered lock actuator connected to the microcontroller, the lock actuator being responsive to a signal from the microcontroller to move the lock between the locked state and the unlocked state;
the power monitor and comparator circuit having an input connected to the primary power supply input to detect the power failure condition, the power monitor and comparator circuit generates a control output to the electrically controllable switch circuit and a signal output connected to the microcontroller in response to the power failure condition, the power monitor and comparator circuit signaling the microcontroller via a power failure signal applied to the signal output when the power failure condition is detected at the primary power supply input; wherein the power monitor and comparator circuit includes the lower voltage threshold and determines the power failure condition by comparing a voltage at the primary power supply input to the lower voltage threshold, wherein the power monitor and comparator circuit includes the upper voltage threshold and signals the microcontroller to stop executing the microcontroller executable instructions for the power failure state and begin executing the microcontroller executable instructions for the normal power state when the voltage at the primary power supply input raises above the upper voltage threshold after the power failure condition occurred, and wherein the lower voltage threshold and the upper voltage threshold related by hysteresis to prevent oscillation at or near transition points between the power failure state and the normal power state whereby upon detecting the power failure condition the electrically controllable switch circuit receives power from the auxiliary power supply to reduce power load on and enable recovery of the primary power supply input, and once the primary power supply input has recovered the electrically controllable switch circuit switching power back to the primary power supply input;
an auxiliary power supply having an auxiliary power output;
the electrically controllable switch circuit having a primary power input connected to the primary power supply input, an auxiliary power input connected to the auxiliary power output of the auxiliary power supply, a power output connected to the microcontroller to provide power to the microcontroller and the lock actuator, and a control input connected to the control output of the power monitor and comparator circuit, the power monitor circuit controlling the electrically controllable switch circuit to selectively connect the power output between the primary source of electrical power and the auxiliary power supply; and
a visual indicator operable by the microcontroller to indicate the power failure condition;
executing tasks, by the microcontroller of the electronic lock, in a loop during the normal power condition;
switching to the auxiliary power supply having at least one supercapacitor in the power failure condition to supply power to the electronic lock from the at least one supercapacitor during the power failure condition;
setting the electronic lock to a desired locked or unlocked state after detecting the power failure condition;
repeatedly monitoring a charge level of the at least one supercapacitor during the normal power condition;
turning on a supercapacitor charger during the normal power condition when the charge level of the at least one supercapacitor is below a desired level;

turning off the supercapacitor charger during the normal power condition when the charge level of the at least one supercapacitor has reached a desired level;

turning on the visual indicator during the power failure condition; and resetting the electronic lock after the power failure condition has been detected if the normal power condition is subsequently detected for a predetermined period of time.

14. The method of claim 13 wherein the step of executing tasks in a loop during the normal power condition further includes the steps of:

checking to detect the power failure condition after a first indication that the charge level of the at least one supercapacitor has reached a desired level;

setting a power failure flag upon detection of the power failure condition and returning to tasks in the loop executed during the normal power condition; and checking if the power failure flag has been set, and thereafter executing the steps of setting the electronic lock to a desired locked or unlocked state for the power failure condition, turning on the visual indicator and resetting the electronic lock after the power failure condition has been detected if the normal power condition is subsequently detected.

15. The method of claim 14 further including the step of turning off power consuming functions prior to the step of setting the electronic lock to a desired locked or unlocked state in the power failure condition.

\* \* \* \* \*